United States Patent
Brinkman

(10) Patent No.: US 12,481,821 B2
(45) Date of Patent: Nov. 25, 2025

(54) USING HYPERLINKS TO REPRESENT FORM FIELD ELEMENTS

(71) Applicant: Adobe Inc., San Jose, CA (US)

(72) Inventor: John Brinkman, Ottawa (CA)

(73) Assignee: Adobe Inc., San Jose, CA (US)

( * ) Notice: Subject to any disclaimer, the term of this patent is extended or adjusted under 35 U.S.C. 154(b) by 184 days.

(21) Appl. No.: 18/446,312

(22) Filed: Aug. 8, 2023

(65) Prior Publication Data

US 2025/0053729 A1  Feb. 13, 2025

(51) Int. Cl.
G06F 3/048 (2013.01)
G06F 40/106 (2020.01)
G06F 40/134 (2020.01)
G06F 40/174 (2020.01)
G06F 40/205 (2020.01)

(52) U.S. Cl.
CPC .......... *G06F 40/174* (2020.01); *G06F 40/106* (2020.01); *G06F 40/134* (2020.01); *G06F 40/205* (2020.01)

(58) Field of Classification Search
CPC .... G06F 40/174; G06F 40/134; G06F 40/205; G06F 40/106
See application file for complete search history.

(56) References Cited

U.S. PATENT DOCUMENTS

| | | | |
|---|---|---|---|
| 10,339,192 B1 * | 7/2019 | Sanchez | G06F 16/9535 |
| 10,885,423 B1 * | 1/2021 | Voicu | G06F 3/04817 |
| 11,055,692 B1 * | 7/2021 | Bodalia | G06Q 30/0633 |
| 11,062,291 B1 * | 7/2021 | Brady | G06Q 20/10 |
| 11,294,793 B1 * | 4/2022 | Stan | G06F 11/3698 |
| 11,699,157 B1 * | 7/2023 | Ducker | G06Q 20/108 705/75 |
| 11,762,988 B1 * | 9/2023 | Bhide | G06F 21/552 726/25 |
| 12,061,951 B1 * | 8/2024 | Vaassen | G06K 7/1417 |
| 2001/0037405 A1 * | 11/2001 | Sideek | H04L 67/04 707/E17.121 |
| 2004/0183748 A1 * | 9/2004 | Silverbrook | G06Q 30/02 345/1.1 |
| 2005/0149851 A1 * | 7/2005 | Mittal | G06F 16/9558 707/E17.116 |
| 2007/0240031 A1 * | 10/2007 | Zhao | G06F 16/355 707/999.005 |

(Continued)

FOREIGN PATENT DOCUMENTS

JP    6204981 B2 *  9/2017  ............. G06F 21/51

*Primary Examiner* — Linh K Pham

(74) *Attorney, Agent, or Firm* — Nicholson De Vos Webster & Elliott LLP

(57) ABSTRACT

Embodiments are disclosed for generating form field elements in a document based on hyperlinks with the form field properties representing properties of a form field. In particular, in one or more embodiments, the method may include generating a visible anchor element in a first document, the visible anchor element representing a hyperlink containing the form field properties of a form field of the first document. The method may further include converting the first document from a first format to a second document in a second format. The method may further include generating a form field element in the second document based on the hyperlink containing the form field properties.

20 Claims, 9 Drawing Sheets

(56) References Cited

U.S. PATENT DOCUMENTS

| | | | | |
|---|---|---|---|---|
| 2009/0102811 A1* | 4/2009 | Lapstun | .................. | H04M 3/42 |
| | | | | 345/173 |
| 2012/0216137 A1* | 8/2012 | Aman | ....................... | G06F 8/38 |
| | | | | 715/765 |
| 2020/0137110 A1* | 4/2020 | Tyler | ................... | H04L 63/1483 |
| 2021/0110233 A1* | 4/2021 | Voicu | ................. | G06F 3/04817 |
| 2021/0342541 A1* | 11/2021 | Taylor | ................. | G06F 40/295 |

* cited by examiner

Personal Information Form

402

404 Name

406 ☐ Employed 408

USING HYPERLINKS TO REPRESENT FORM FIELD ELEMENTS

BACKGROUND

Interactive form documents include descriptive content, such as headings, paragraphs, graphics, labels, etc., combined with interactive form field elements used to capture data. Interactive form documents allow users and businesses to collect or compile information in a uniform and efficient manner. Interactive form documents are used to provide and/or gather information for different purposes, including personal data for visitors to a webpage, for medical purposes, to process financial transactions, etc. Form authoring tools are available to streamline the process of generating form documents. For example, some form authoring tools provide users the ability to drag and drop form field elements (e.g., textboxes, dropdown menus, buttons, etc.) into a document.

SUMMARY

Introduced here are techniques/technologies that allow a word processing system executing on a processing device to generate form field elements in a word processing document based on identifying a hyperlink that includes form field properties and processing the form field properties included as URL parameters in the hyperlink. The form field properties can be received by the processing device using form authoring tools. When the word processing document is converted to a second format (e.g., an interactive form), the hyperlink that includes the form field properties can be recognized, which causes a form field element to be created in the interactive form in place of the hyperlink that includes the form field properties.

In particular, in one or more embodiments, a processing device receives an input in a word processing application that includes form field properties for form field elements (e.g., textboxes, buttons, etc.) for a document. The form field properties can be provided using a user interface (e.g., a form authoring add-in to the word processing application or via a standalone application that interfaces with the word processing application). Example form field properties can include a form field name, a form field type, default values, etc. for each form field element to be created. The digital design generates a hyperlink using the form field properties, where the form field properties are embedded within the hyperlink as URL parameters. The processing device further places a visible anchor element in the word processing document that marks the beginning and/or the end of the hyperlink. The document can then be converted from a word processing document associated with the word processing application to an interactive form. As part of the converting the word processing document, the processing device generates form field elements in the interactive form. Each form field element is generated by detecting a corresponding hyperlink and using the corresponding form field properties.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which:

FIG. 4 illustrates an example document generated with a form field generated from a hyperlink with form field properties in accordance with one or more embodiments;

DETAILED DESCRIPTION

Figure 1:
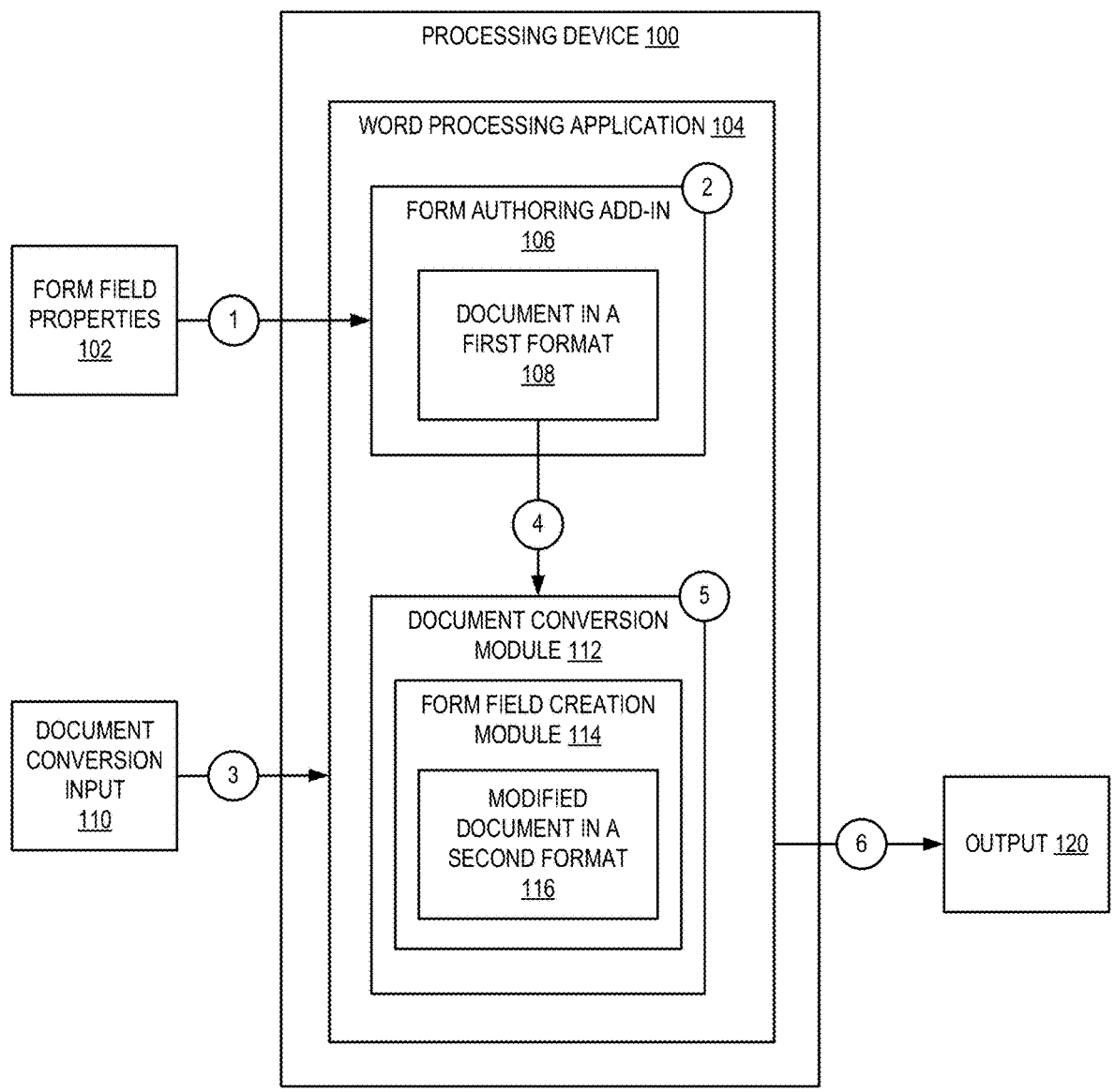
FIG. 1 illustrates a diagram of a process of creating form field elements based on generated hyperlinks with form field properties in accordance with one or more embodiments.

One or more embodiments of the present disclosure include a system that converts a word processing document that includes a hyperlink storing properties of a form field, into an interactive form, where the hyperlink is converted to a form field element (e.g., textbox, button, etc.) in the interactive form. Typically, a user will use a word processing application (e.g., Word, Google Docs, etc.) to create a word processing document (e.g., Word Document, OpenDocument, etc.) with the descriptive content. While word processing tools are well suited to creating descriptive content, they have limited capacity to define form field elements.

For example, some conventional form authoring tools allow users to create form field elements in documents. These conventional approaches require a user to manually create form fields in the word processing document. For example, the user manually draws or inserts textboxes or buttons in their word processing document (e.g., using form graphics). However, these form fields do not survive when the word processing document is converted to second format (e.g., a PDF document). Instead, to create an interactive form the user converts their word processing document to a PDF document and uses form authoring tools to manually add interactive form fields to the form file. For example, a user can manually add form fields by selecting a type of form field and drawing the form field element (e.g., textbox) in the interactive form. However, if the user needs to make any edits to the word processing document, they have to go back and make any such changes in the word processing document, resulting in the loss of any manually added form field elements. After the user makes desired edits in the word processing document, they must then convert the word processing document to the interactive form again, and then manually add the form field elements again. This can result in a poor user experience as the user may need to reconvert the word processing document multiple times if any edits to the word processing document are needed. Other solutions use text tags that are written into the word processing document that can be interpreted as form fields. However, these solutions require the user to know the particulars of the text tag syntax to generate any form field elements.

To address these and other deficiencies in conventional systems, embodiments enable form field authoring in a word processing application by creating a hyperlink storing form field properties. A user can provide form field properties using a form authoring add-in tool, which creates a hyperlink with a reserved or known domain that includes the form field properties as URL parameters. The hyperlink can be associated with a visible anchor element (e.g., text, icons, images, etc.) placed in the word processing document. When the word processing document is converted to an interactive form (e.g., HTML, PDF, etc.), the reserved or known domain can be identified, which indicates that a form field element defined by the form field properties should be placed in the interactive form in place of the hyperlink.

As the form field authoring is performed in a document in a word processing application using a form authoring add-in, revisions or modifications to the word processing document can be performed in the word processing application without the loss of any form field elements defined by the hyperlinks, improving user experience. Further, the form authoring add-in utilizes fewer resources as it can be integrated into word processing applications to enable the conversion of word processing documents into interactive forms without the use of an additional application.

FIG. 1 illustrates a diagram of a process of creating form field elements based on generated hyperlinks with form field properties in accordance with one or more embodiments. As shown in FIG. 1, a processing device 100 receives form field properties 102 as an input, as shown at numeral 1. For example, the processing device 100 receives the form field properties 102 from a user via a computing device or from a memory or storage location. In one or more embodiments, the form field properties 102 can be provided via the form authoring add-in 106. The form authoring add-in 106 can be a software component integrated into a word processing application 104. In one or more embodiments, the form authoring add-in 106 can be integrated into the word processing application 104 through a software installation package. In such embodiments, installation of the software installation package configures an interface and/or protocol for the exchange of data between the word processing application 104 and the form authoring add-in 106. In other embodiments, the form authoring add-in 106 can be integrated into another application (e.g., a document viewer) or a standalone application.

The form authoring add-in 106 can include a graphical user interface that can receive the form field properties 102 for one or more form field elements. For example, the form authoring add-in 106 can include textboxes, buttons (e.g., radio buttons, selectable buttons, etc.), dropdown menus, etc. to allow a user to submit the form field properties 102. The form field properties 102 can include various properties defining a form field element, including, but not limited to, a field name or identifier, a field type, a default value, indication of whether a value for the form field element is required, etc. Additional details for an exemplary form authoring add-in are illustrated in FIG. 2.

Figure 2:
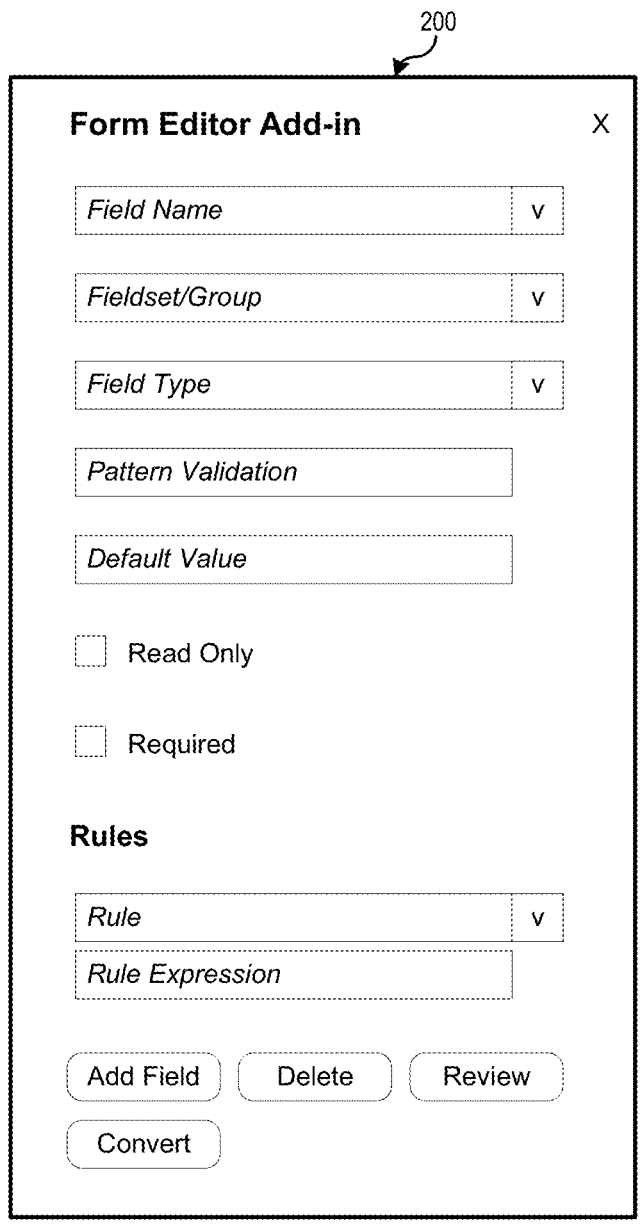
FIG. 2 illustrates an example form authoring add-in in accordance with one or more embodiments.

FIG. 2 illustrates an example form authoring add-in in accordance with one or more embodiments. The form authoring add-in 200 depicts a number of interface elements, including textboxes or text fields, checkboxes, selectable buttons, drop-down menus, etc. In other embodiments, the form authoring add-in 200 can include additional, fewer, or different interface elements.

In one or more embodiments, the "Field Name" parameter allows a user to provide a form field name or field identifier to a new form field. The "Fieldset/Group" parameter allows a user to group logically-related form fields. For example, the form fields for an address (e.g., street, city, zip code, state/province, etc.) can be grouped into an "address" fieldset. The "Field Type" parameter allows a user to define a form field type for the new form field. For example, example form field types can include text, checkbox, date, drop-down, radio button, signature, submit button, plain text, etc. The "Pattern Validation" parameters defines an expected pattern for inputs in the form field. For example, where the form field is a phone number, the "Pattern Validation" parameters can require a specific pattern (e.g., ###-###-####) or specific characters (e.g., numbers only). The "Default Value" parameter can indicate a default value, e.g., for a drop-down box field or a text field. The form authoring add-in 200 also includes options to define a form field as "Read Only" and/or "Required" by selecting corresponding checkboxes. The form authoring add-in 200 can also include an option to define rules, via a "Rule" drop-down menu and a "Rule Expression" text box to define the parameters of a rule. For example, a rule can define when to display certain form fields, such as an example rule that would make a "States" form field element visible if the entry in the "Country" form field element equals "USA," while a "Province" form field element would be visible if the entry in the "Country" form field element equals "Canada." Additional parameters (not depicted in FIG. 2) can include a "Placeholder" parameter that provides a hint/indication to a user as to the information that is expected in the form field (e.g., character type requirements for a password), "Min" and "Max" parameters that define the most negative and positive values, respectively, in the range of permitted values, and a "Checked" parameter for radio buttons and checkboxes, which indicate that the radio button is the currently selected one in the group of same-named radio buttons and the checkbox is checked by default, respectively.

The form authoring add-in 200 also includes selectable buttons that allow a user to add a visible anchor element for the form field defined by the form field properties, delete an existing a visible anchor element and its corresponding form field properties, or review a form field being defined using the form authoring add-in 200. Further, the form authoring add-in 200 includes a "Convert" button that can automatically convert the word processing document to an interactive form (e.g., HTML, PDF, etc.) without requiring a user to access another application to perform the conversion.

Returning to FIG. 1, the word processing application 104 processes the form field properties 102 to generate hyperlinks with form field properties in a document in a first format 108, as shown at numeral 2. In one or more embodiments, the document in the first format 108 is a word processing document generated in the word processing application 104. For example, in response to receiving the form field properties 102 defining a form field element, the form authoring add-in 106 generates a hyperlink with form field properties using the form field properties 102. In one or more embodiments, the form authoring add-in 106 generates the hyperlink with form field properties by embedding the form field properties 102 as URL parameters in the hyperlink.

The hyperlink with the form field properties is further generated to include a reserved or known domain that can be recognized as a domain used for the creation of form field elements. The form authoring add-in 106 further associates a visible anchor element with the hyperlink with the form field properties in the document in the first format 108. Examples of visible anchor elements can include text, icons, and images that are visible in the document in the first format 108. The document in the first format 108 can include a combination of text and images input using the word processing application and hyperlinks with form field properties generated using inputs provided to the form authoring add-in. An example document in the first format 108 is described with additional detail in FIG. 3.

Figure 3:
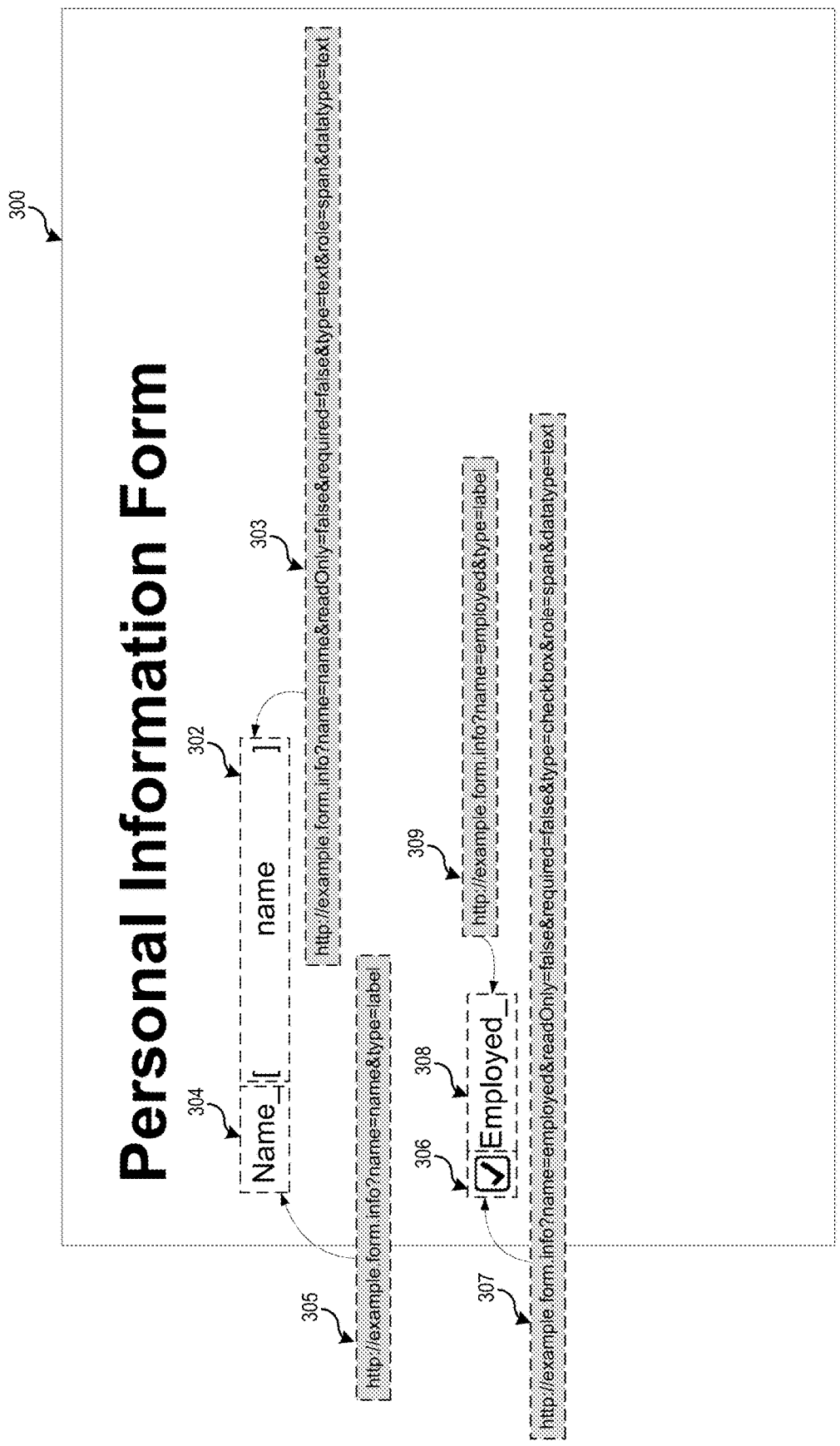
FIG. 3 illustrates an example document generated with hyperlinks with form field properties in accordance with one or more embodiments.

FIG. 3 illustrates an example document generated with hyperlinks with form field properties in accordance with one or more embodiments. For example, the form field properties 102 input can include an input of "name" as the "Field Name" parameter and a selection of "text" as the "Field Type" parameter. Upon selection of the "Add Field" button, a visible anchor element 302 ("[name]") is generated in a document 300. The visible anchor element 302 can be manipulated or modified to define a position, size, shape, etc. of the form field element to be generated. For example, the amount of space between the brackets in visible anchor element 302 can indicate the length of a textbox to be generated in place of the visible anchor element 302 when converted. In one or more embodiments, document 300 is a word processing document. In one or more embodiments, document 300 is generated in a word processing application 104 (e.g., a word processing application or similar). The word processing application 104 generates and associates a hyperlink 303 with the visible anchor element 302. For example, the hyperlink 303: "http://example.form.info?name=name&readOnly=false&required=true&type=text&placeholder=Name:" is generated for visible anchor element 302. Embedded, or stored, within the hyperlink 303 as URL parameters are the form field properties established by the form field properties 102 provided as input to the form authoring add-in 200.

In one or more embodiments, after the visible anchor element 302 is generated in document 300, the visible anchor element 302 can be modified without having an effect on hyperlink 303. For example, the user can modify the size of the visible anchor element 302, where modifying the size of the visible anchor element 302 modifies the size of the form field that will be created in place of the hyperlink 303.

In one or more embodiments, the word processing application 104 can optionally assign text 304 as being an HTML "label" element associated with, or pointing to, the visible anchor element 302. For example, selecting the text 304 and assigning it the same "Field Name" parameter as the visible anchor element 302, e.g., "name," associates a hyperlink 305 with the text 304 as follows: "http://example.form.info?name=name&type=label." In one or more embodiments, hyperlink 303 and hyperlink 305 may be visible on the document 300 by hovering a cursor over visible anchor element 302 and text 304, respectively.

In another example, the form field properties 102 input can include an input of "employed" as the "Field Name" parameter and a selection of "checkbox" as the "Field Type" parameter. Upon selection of the "Add Field" button, a visible anchor element 306 in the form of a checkbox is generated in document 300. In the example depicted in FIG. 3, the visible anchor element 306 is an image of a checkbox. However, in other embodiments, the visible anchor element depicting a checkbox can be in another form, including text, similar to visible anchor element 302, or another image. The word processing application 104 associates a hyperlink 307 with the visible anchor element 306. For example, the hyperlink 307: "http://example.form.info?name=employed&readOnly=false&required=false&type=checkbox&checked=false" is generated for visible anchor element 306.

Similar to text 304, the word processing application 104 can optionally assign text 308 as being an HTML "label" element associated with visible anchor element 306. For example, selecting the text 308 and assigning it the same "Field Name" parameter as the visible anchor element 306, e.g., "employed," associates a hyperlink 309 with the text 308 as follows: "http://example.form.info?name=employed&type=label." In one or more embodiments, hyperlink 307 and hyperlink 309 may be visible on the document 300 by hovering a cursor over visible anchor element 306 and text 308, respectively.

Returning to FIG. 1, the processing device 100 receives a document conversion input 110, as shown at numeral 3. In one or more embodiments, after generating the document in the first format 108, the processing device 100 receives a document conversion input 110 that indicates a request to convert the document from the first format to a second format. In one or more embodiments, the second format is an interactive form. An interactive form can include descriptive content (e.g., headings, paragraphs, graphics, labels, etc.) combined with interactive form field objects used to capture data. The file format for an interactive form is commonly an HTML or PDF document.

The document conversion input 110 can be a selection of a button, command, or option in the word processing application 104. In one or more embodiments, a user can select a "Convert" interface element (e.g., button) in the form authoring add-in (e.g., form authoring add-in 200) that instructs the word processing application 104 to convert the document from the first format to the second format.

In one or more embodiments, the document in the first format 108 can be passed to a document conversion module 112 responsive to receiving the document conversion input 110, as shown at numeral 4. In some embodiments, the document conversion module 112 is a module within the word processing application 104. The document conversion module 112 can include a form field creation module 114 configured to generate form fields based on recognizing and processing hyperlinks with form field properties generated by the form authoring add-in 106. In response to receiving the document conversion input 110 and the document in the first format 108, the form field creation module 114 generates a modified document in a second format 116, at numeral 5.

In one or more embodiments, after generating the document in the first format 108 in the word processing application 104, the document in the first format 108 can be opened in a different application that performs the conversion instructed by the document conversion input 110. An example modified document in a second format 116 is described with additional detail in FIG. 4.

FIG. 4 illustrates an example document generated with a form field generated from a hyperlink with form field properties in accordance with one or more embodiments. Document 400 is a second document in a second format generated from the conversion of document 300 (e.g., from FIG. 3) from a first format by a document converter (e.g., document conversion module 112 in FIG. 1). When the document 300 is converted to a second format (e.g., an interactive form in HTML, PDF, etc.), the hyperlink 303 is identified causing the document converter to generate a form field element in document 400 in place of the visible anchor element 302. In one or more embodiments, the document converter can parse document 300 to identify the URL of the hyperlink 303. In some embodiments, the document converter can identify the URL as a hyperlink with form field properties based on determining that it includes a known/ reserved domain address for a form field element. For example, the document converter can identify the domain "example.form.info" in the hyperlink 303 and recognize the domain as a reserved domain including form field properties for generating form field elements. As illustrated in FIG. 4, a form field element 402 in the form of a textbox is generated in place of the visible anchor element 302 based on the URL parameters of hyperlink 303. As text 304 in FIG. 3 was associated with visible anchor element 302 and the hyperlink 303 using a "label" URL parameters, a user selection (e.g., via a click) of the text 404 ("Name") will cause form field element 402 to be selected. This can result in a text cursor to appear within form field element 402 to allow entry of text in a similar manner that would result from a user selection of the form field element 402 itself.

Similarly, when the document 300 is converted to document 400, the hyperlink 307 is identified causing the document converter to generate a form field element in document 400 in place of the visible anchor element 306. In one or more embodiments, the document converter can parse the URL of the hyperlink 307 to identify the URL as a known/reserved domain address for a form field element. As illustrated in FIG. 4, a form field element 406 in the form of a checkbox is generated in place of the visible anchor element 306 based on the URL parameters of hyperlink 307. As text 308 in FIG. 3 was associated with visible anchor element 306 and the hyperlink 307 using a "label" URL parameter, a user selection (e.g., a click, tap, or similar interaction) of the text 408 ("Employed") will cause form field element 406 to be selected (e.g., checked) in a similar manner that would result from a user selection of the form field element 406 itself.

Returning to FIG. 1, after the document conversion module 112 generates the modified document in the second format 116, the modified document in the second format 116 can be sent as an output 120, as shown at numeral 6. In one or more embodiments, after the process described above in numerals 1-5, the modified document in the second format 116 can be displayed in the processing device 100, sent through a communications channel to another computing device associated with the user or another user, or to another system or application. The modified document in the second format 116 can then be interacted with by a user (e.g., the selection of buttons, the entering of information in textboxes, etc.).

Figure 5:
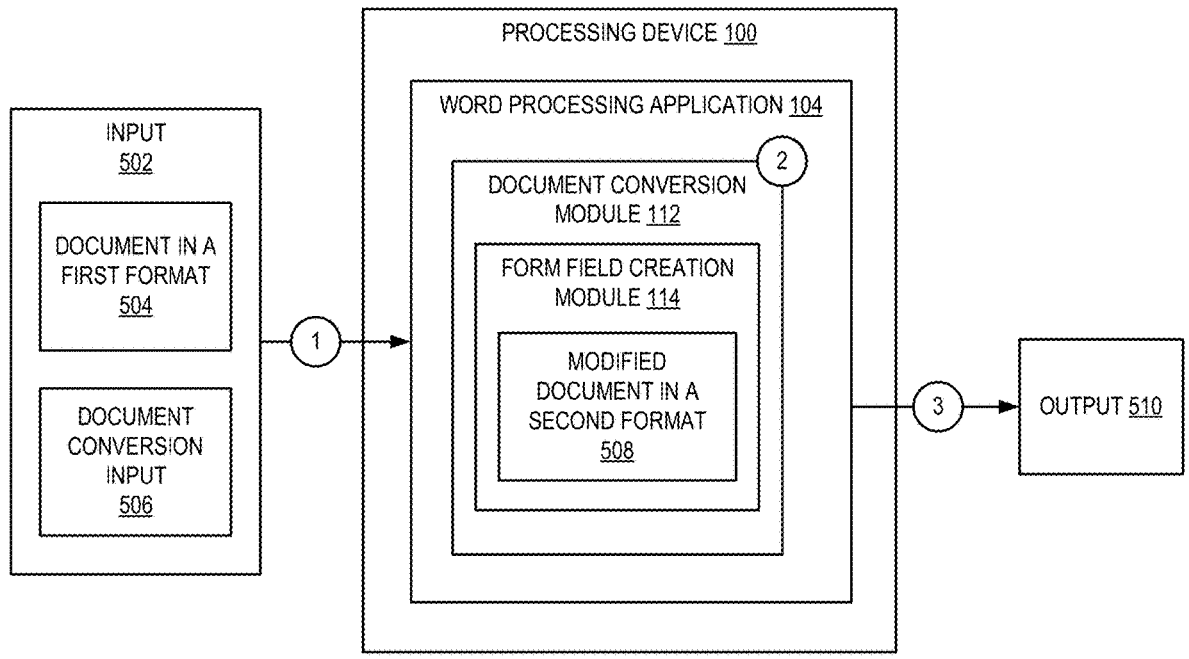
FIG. 5 illustrates a diagram of a process of creating form field elements based on generated hyperlinks with form field properties in accordance with one or more embodiments.

FIG. 5 illustrates a diagram of a process of creating form field elements based on generated hyperlink with form field properties in accordance with one or more embodiments. In the embodiment shown in FIG. 5, a document in a first format with hyperlinks with form field properties can be generated by a different application prior to being transmitted to the processing device 100. In one or more embodiments, the document in the first format is a word processing document generated in a word processing application. As shown in FIG. 5, a processing device 100 receives an input 502, as shown in numeral 1. The input 502 can include a document in a first format 504 and a document conversion input 506. In one or more embodiments, the processing device 100 receives the input 502 from a user via a computing device or from a memory or storage location. In one or more embodiments, the input 502 can be provided in a graphical user interface (GUI).

The first document in the first format 504 can include one or more hyperlink with form field properties generated as described previously with respect to FIG. 1. The document conversion input 506 can include a request to convert the first document in the first format 504 to a second format (e.g., from a word processing document to an interactive form).

In one or more embodiments, the document in the first format 504 can be received by a document conversion module 112. In some embodiments, the document conversion module 112 is a module within the word processing application 104. The document conversion module 112 can include a form field creation module 114 configured to generate form fields based on recognizing and processing hyperlinks with form field properties in documents (e.g., the document in the first format 504). In response to receiving the document in the first format 504 and the document conversion input 506, the form field creation module 114 generates a modified document in a second format 508, at numeral 2, as described previously with respect to FIG. 1.

After the document conversion module 112 generates the modified document in the second format 508, the modified document in the second format 508 can be sent as an output 510, as shown at numeral 3. In one or more embodiments, after the process described above in numerals 1-2, the modified document in the second format 508 can be displayed in the processing device 100, sent through a communications channel to another computing device associated with the user or another user, or to another system or application. The modified document in the second format 508 can then be interacted with by a user (e.g., the selection of buttons, the entering of information in textboxes, etc.).

Figure 6:
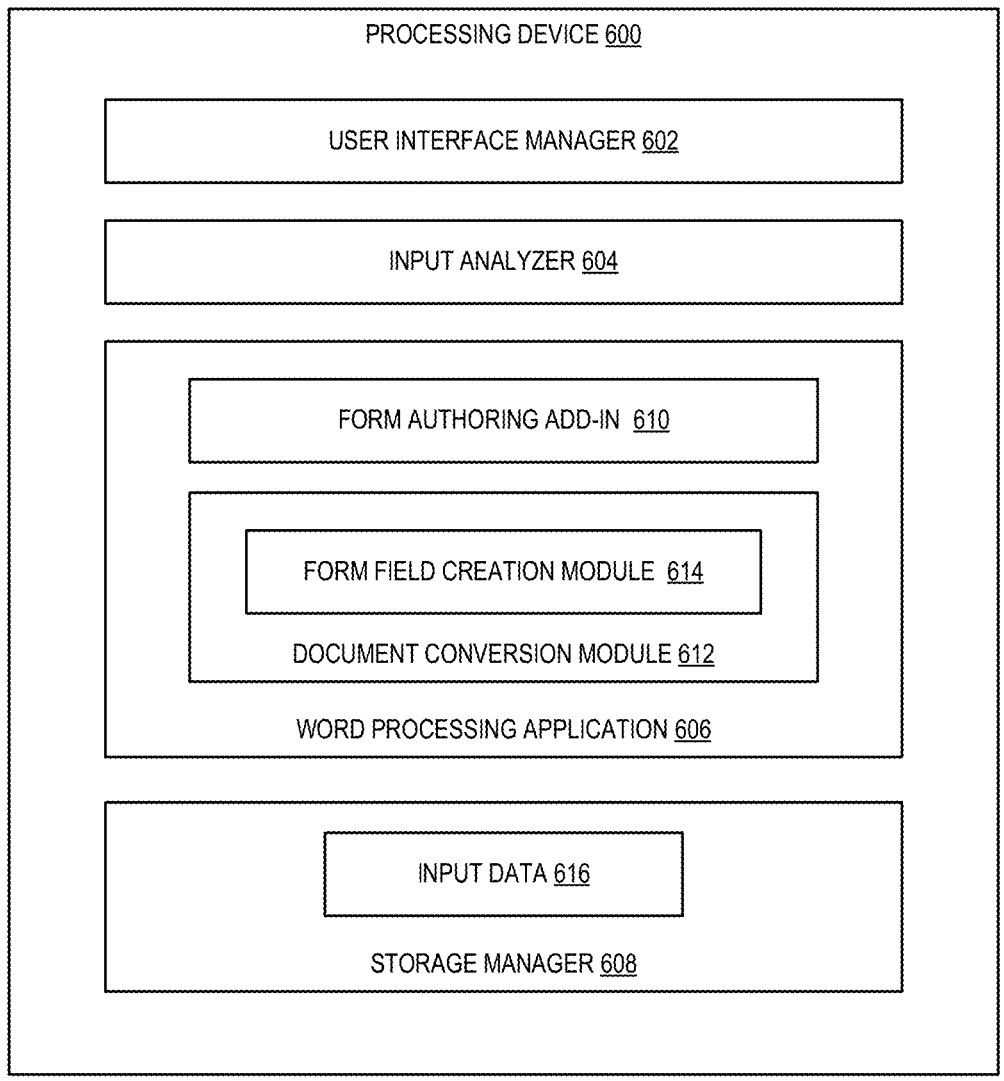
FIG. 6 illustrates a schematic diagram of a processing device in accordance with one or more embodiments.

FIG. 6 illustrates a schematic diagram of a processing device (e.g., "processing device" described above) in accordance with one or more embodiments. As shown, the processing device 600 may include, but is not limited to, a user interface manager 602, an input analyzer 604, a word processing application 606, and a storage manager 608. The word processing application 606 includes a form authoring add-in 610 and a document conversion module 612. The document conversion module 612 includes a form field creation module 614. The storage manager 608 includes input data 616.

As illustrated in FIG. 6, the processing device 600 includes the user interface manager 602. For example, the user interface manager 602 allows users to provide inputs to the processing device 600, including inputs defining properties for form fields and documents within which to generate form field elements. In some embodiments, the user interface manager 602 provides a user interface through which the user can upload a document or provide the properties for form fields. Alternatively, or additionally, the user interface may enable the user to download the document from a local or remote storage location (e.g., by providing an address (e.g., a URL or other endpoint) associated with a document source).

As further illustrated in FIG. 6, the processing device 600 also includes the input analyzer 604. The input analyzer 604 may be configured to analyze inputs received by the processing device 600 to identify documents. The input analyzer 604 may be further configured to identify hyperlinks with form field properties within documents, e.g., by parsing documents and recognizing known or reserved domains.

As further illustrated in FIG. 6, the processing device 600 also includes the word processing application 606. The word processing application 606 includes a form authoring add-in form authoring add-in 610 and a document conversion module 612. The form authoring add-in 610 is configured to generate a visible anchor element and a hyperlinks with form field properties associated with the visible anchor element in a document by embedding form field properties received by the word processing application 606 as URL parameters in the hyperlink. The form authoring add-in 610 can include an interface to receive user inputs defining the form field properties for form fields.

The document conversion module 612 is configured to convert documents from a first format to a second format. For example, the document conversion module 612 can convert documents from a word processing format associated with the word processing application 606 to an interactive form (e.g., HTML, PDF, etc.). As part of the conversion, the document conversion module 612 can utilize a form field creation module 614 configured to identify hyperlinks with form field properties in documents and generate form field elements in place of the visible anchor elements associated with hyperlinks with form field properties. The form field creation module 614 uses the URL parameters of the hyperlinks with form field properties defining the type and appearance of the form field element to create the form field element.

As illustrated in FIG. 6, the processing device 600 also includes the storage manager 608. The storage manager 608 maintains data for the processing device 600. The storage manager 608 can maintain data of any type, size, or kind as necessary to perform the functions of the processing device 600. The storage manager 608, as shown in FIG. 6, includes the input data 616. The input data 616 can include form field properties for generating hyperlinks with form field properties and documents (e.g., word processing documents) provided to the processing device 600, as discussed in additional detail above.

Each of the components 602-608 of the processing device 600 and their corresponding elements (as shown in FIG. 6) may be in communication with one another using any suitable communication technologies. It will be recognized that although components 602-608 and their corresponding elements are shown to be separate in FIG. 6, any of components 602-608 and their corresponding elements may be combined into fewer components, such as into a single facility or module, divided into more components, or configured into different components as may serve a particular embodiment.

The components 602-608 and their corresponding elements can comprise software, hardware, or both. For example, the components 602-608 and their corresponding elements can comprise one or more instructions stored on a computer-readable storage medium and executable by processors of one or more computing devices. When executed by the one or more processors, the computer-executable instructions of the processing device 600 can cause a client device and/or a server device to perform the methods described herein. Alternatively, the components 602-608 and their corresponding elements can comprise hardware, such as a special purpose processing device to perform a certain function or group of functions. Additionally, the components 602-608 and their corresponding elements can comprise a combination of computer-executable instructions and hardware.

Furthermore, the components 602-608 of the processing device 600 may, for example, be implemented as one or more stand-alone applications, as one or more modules of an application, as one or more plug-ins, as one or more library functions or functions that may be called by other applications, and/or as a cloud-computing model. Thus, the components 602-608 of the processing device 600 may be implemented as a stand-alone application, such as a desktop or mobile application. Furthermore, the components 602-608 of the processing device 600 may be implemented as one or more web-based applications hosted on a remote server. Alternatively, or additionally, the components of the processing device 600 may be implemented in a suite of mobile device applications or "apps."

As shown, the processing device 600 can be implemented as a single system. In other embodiments, the processing device 600 can be implemented in whole, or in part, across multiple systems. For example, one or more functions of the processing device 600 can be performed by one or more servers, and one or more functions of the processing device 600 can be performed by one or more client devices. The one or more servers and/or one or more client devices may generate, store, receive, and transmit any type of data used by the processing device 600, as described herein.

In one implementation, the one or more client devices can include or implement at least a portion of the processing device 600. In other implementations, the one or more servers can include or implement at least a portion of the processing device 600. For instance, the processing device 600 can include an application running on the one or more servers or a portion of the processing device 600 can be downloaded from the one or more servers. Additionally, or alternatively, the processing device 600 can include a web hosting application that allows the client device(s) to interact with content hosted at the one or more server(s).

For example, upon a client device accessing a webpage or other web application hosted at the one or more servers, in one or more embodiments, the one or more servers can provide a user of the client device with an interface to provide inputs, including documents and form field properties defining form fields. Upon receiving the inputs, the one or more servers can automatically perform the methods and processes described above to generate hyperlinks with form field properties and/or generated form field elements in document based on hyperlinks with form field properties.

The server(s) and/or client device(s) may communicate using any communication platforms and technologies suitable for transporting data and/or communication signals, including any known communication technologies, devices, media, and protocols supportive of remote data communications, examples of which will be described in more detail below with respect to FIG. 9. In some embodiments, the server(s) and/or client device(s) communicate via one or more networks. A network may include a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. The one or more networks will be discussed in more detail below with regard to FIG. 9.

The server(s) may include one or more hardware servers (e.g., hosts), each with its own computing resources (e.g., processors, memory, disk space, networking bandwidth, etc.) which may be securely divided between multiple customers (e.g., client devices), each of which may host their own applications on the server(s). The client device(s) may include one or more personal computers, laptop computers, mobile devices, mobile phones, tablets, special purpose computers, TVs, or other computing devices, including computing devices described below with regard to FIG. 9.

Figure 7:
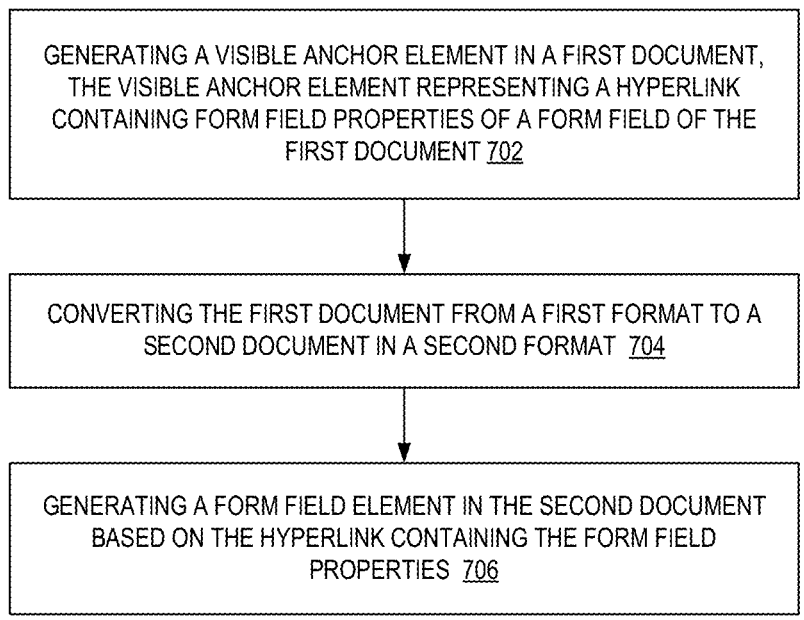
FIG. 7 illustrates a flowchart of a series of acts in a method of generating form field elements in a document based on a hyperlink containing the form field properties in accordance with one or more embodiments.
Figure 8:
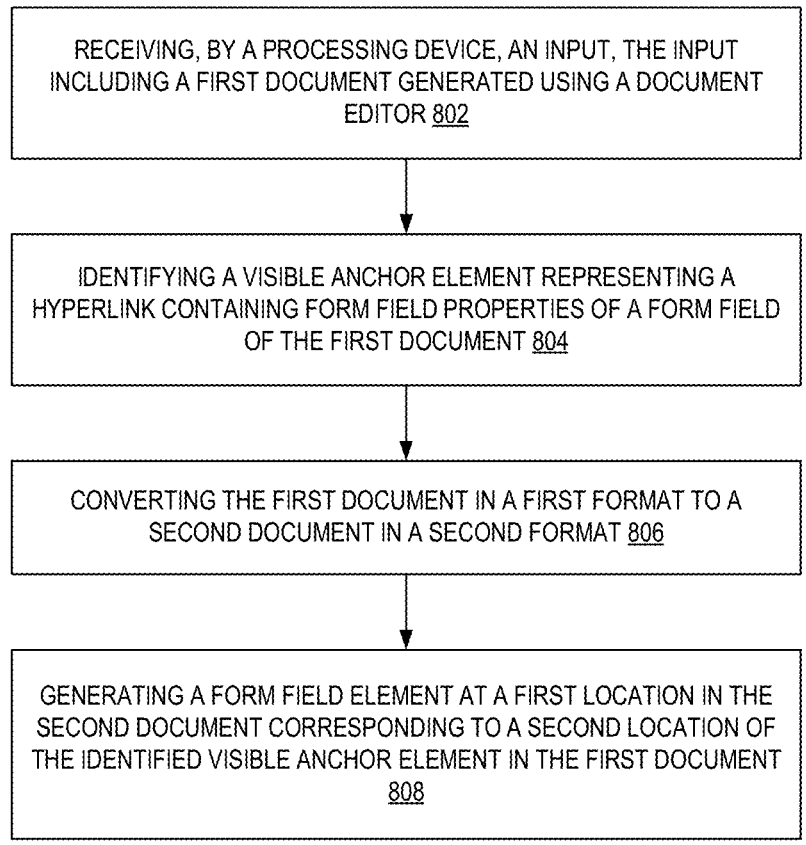
FIG. 8 illustrates a flowchart of a series of acts in a method of generating form field elements in a document based on a hyperlink containing form field properties in accordance with one or more embodiments.

FIGS. 1-6, the corresponding text, and the examples, provide a number of different systems and devices to allow a processing device to generate form field elements in a document based on hyperlinks with form field properties. In addition to the foregoing, embodiments can also be described in terms of flowcharts comprising acts and steps in a method for accomplishing a particular result. For example, FIGS. 7-8 illustrate flowcharts of exemplary methods in accordance with one or more embodiments. The methods described in relation to FIGS. 7 and 8 may be performed with fewer or more steps/acts or the steps/acts may be performed in differing orders. Additionally, the steps/acts described herein may be repeated or performed in parallel with one another or in parallel with different instances of the same or similar steps/acts.

FIG. 7 illustrates a flowchart of a series of acts in a method of generating form field elements in a document based on a hyperlink containing form field properties in accordance with one or more embodiments. In one or more embodiments, the method 700 is performed in a digital medium environment that includes the processing device 600. The method 700 is intended to be illustrative of one or more methods in accordance with the present disclosure and is not intended to limit potential embodiments. Alternative embodiments can include additional, fewer, or different steps than those articulated in FIG. 7.

As illustrated in FIG. 7, the method 700 includes an act 702 of generating, by a processing device, a visible anchor element in a first document, the visible anchor element representing a hyperlink containing form field properties of a form field of the first document. In one or more embodiments, the processing device receives an input from a user (e.g., via a computing device) that includes form field properties defining a form field element. For example, the form field properties can define a field name, a field type, default values, etc. In one or more embodiments, the form field properties can be defined using a form authoring add-in to a word processing application, using features integrated into the word processing application, or via a standalone application. In one or more embodiments, after the form field properties are defined, a visible anchor element can be generated in the first document (e.g., in response to a user selection of an "Add Field" interface element). Using the form field properties, the word processing application further generates and associates a hyperlink with the visible anchor element. The hyperlink can then be embedded with URL parameters representing the form field properties. A hyperlink containing form field properties of a form field refers to a hyperlink that includes the form field properties embedded as URL parameters.

In one or more embodiments, once the visible anchor element and the hyperlink containing the form field properties are generated, modifications to the display of the visible anchor element can be performed without effecting the hyperlink or the URL parameters of the hyperlink. The display of the visible anchor element can be manipulated or modified to define a location/position, size, shape, etc. of the form field element to be generated based on an additional set of inputs received by the word processing application.

In one or more embodiments, the processing device can receive additional inputs to define a label and a second hyperlink for text in the first document. In such embodiments, the processing device receives a selection of text in the first document. The selected text can be adjacent to the hyperlink or in another location in the first document. The processing device then receives a second input selecting a field type as "label" and a field name parameter corresponding to the hyperlink. For example, if the field name parameter for the hyperlink created above was "name," the second input will select or input "name" as the selected field identifier parameter for the label. Based on the second input, the processing device can generate a second hyperlink for the selected text, where the second hyperlink includes URL parameters indicating the selected field identifier parameter and the "label" field type. The second hyperlink associates the text with the hyperlink created above (e.g., via the selected field identifier parameter).

As illustrated in FIG. 7, the method 700 includes an act 704 of converting the first document from a first format to a second document in a second format. In one or more embodiments, the processing device can receive inputs instructing the digital editor, or another application, to convert the first document from a first format (e.g., a word processing document generated in a word processing application) to a second document in a second format (e.g., an interactive form in HTML, PDF, etc.).

As illustrated in FIG. 7, the method 700 includes an act 706 of generating a form field element in the second document based on the hyperlink containing the form field properties. In one or more embodiments, the processing device can generate the form field element when the first document is converted to a second document. The processing device can parse the text in the first document, including any hyperlinks associated with text or objects in the first document, to identify the hyperlinks with the form field properties. In one or more embodiments, the hyperlink containing the form field properties can be identified based on a known or reserved domain used to indicate a hyperlink containing form field properties. Once identified, the processing device can determine the properties of the form field from the form field properties in the hyperlink (e.g., the URL parameters). The processing device can then process the determined properties to generate the form field element in the second document. Examples of form field elements can include a text box, a dropdown menu, a checkbox, a signature field, and a radio button. The form field element can be generated at a location in the second document corresponding to the location of the visible anchor element in the first document.

FIG. 8 illustrates a flowchart of a series of acts in a method of generating form field elements in a document based on a hyperlink containing the form field properties in accordance with one or more embodiments. In one or more embodiments, the method 800 is performed in a digital medium environment that includes the processing device 600. The method 800 is intended to be illustrative of one or more methods in accordance with the present disclosure and is not intended to limit potential embodiments. Alternative embodiments can include additional, fewer, or different steps than those articulated in FIG. 8.

As illustrated in FIG. 8, the method 800 includes an act 802 of receiving, by a processing device, an input, the input including a first document generated using a word processing application. In one or more embodiments, the processing device receives the input from a user (e.g., via a computing device) that includes form field properties defining a form field element. In one or more embodiments, the processing device receives the input from a user via a computing device or from a memory or storage location. In one or more embodiments, the input can be provided in a graphical user interface (GUI). The input can further include a document conversion input indicating a request to convert the first document to a second document.

As illustrated in FIG. 8, the method 800 includes an act 804 of identifying a visible anchor element representing a hyperlink containing form field properties of a form field of the first document. In one or more embodiments, the processing device can parse the text in the first document, including any hyperlinks associated with text or objects in the first document, to identify the hyperlinks with the form field properties. In one or more embodiments, the hyperlinks with the form field properties can be located within the first document by identifying known or reserved domains used to indicate a hyperlink containing form field properties (e.g., "http://example.form.info").

As illustrated in FIG. 8, the method 800 includes an act 806 of converting the first document in a first format (e.g., a word processing document generated in a word processing application) to a second document in a second format (e.g., an interactive form). In one or more embodiments, the processing device can receive inputs instructing the digital editor, or another application, to convert the first document from the first format to the second document in a second format.

As illustrated in FIG. 8, the method 800 includes an act 808 of generating a form field element at a first location in the second document corresponding to a second location of the identified visible anchor element in the first document. In one or more embodiments, the processing device can determine the properties of the form field by identifying properties stored in the hyperlink (e.g., as the URL parameters). The processing device can then generate the form field element in the second document by processing and applying the identified form field properties. Examples of form field elements can include a text box, a dropdown menu, a checkbox, a signature field, and a radio button. The form field element can be generated at a location in the second document corresponding to the location of the visible anchor element in the first document.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other non-transitory storage medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
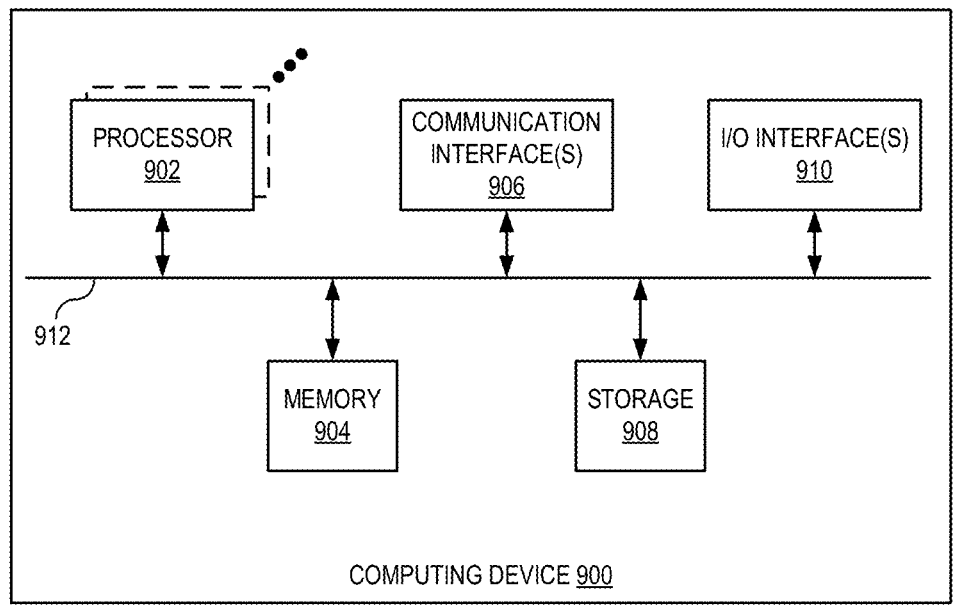
FIG. 9 illustrates a block diagram of an exemplary computing device in accordance with one or more embodiments.

FIG. 9 illustrates, in block diagram form, an exemplary computing device 900 that may be configured to perform one or more of the processes described above. One will appreciate that one or more computing devices such as the computing device 900 may implement the processing device 600. As shown by FIG. 9, the computing device can comprise a processor 902, memory 904, one or more communication interfaces 906, a storage device 908, and one or more I/O devices/interfaces 910. In certain embodiments, the computing device 900 can include fewer or more components than those shown in FIG. 9. Components of computing device 900 shown in FIG. 9 will now be described in additional detail.

In particular embodiments, processor(s) 902 includes hardware for executing instructions, such as those making up a computer program. As an example, and not by way of limitation, to execute instructions, processor(s) 902 may retrieve (or fetch) the instructions from an internal register, an internal cache, memory 904, or a storage device 908 and decode and execute them. In various embodiments, the processor(s) 902 may include one or more central processing units (CPUs), graphics processing units (GPUs), field programmable gate arrays (FPGAs), systems on chip (SoC), or other processor(s) or combinations of processors.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 904 may be internal or distributed memory.

The computing device 900 can further include one or more communication interfaces 906. A communication interface 906 can include hardware, software, or both. The communication interface 906 can provide one or more interfaces for communication (such as, for example, packet-based communication) between the computing device and one or more other computing devices 900 or one or more networks. As an example, and not by way of limitation, communication interface 906 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can comprise hardware, software, or both that couples components of computing device 900 to each other.

The computing device 900 includes a storage device 908 includes storage for storing data or instructions. As an example, and not by way of limitation, storage device 908 can comprise a non-transitory storage medium described above. The storage device 908 may include a hard disk drive (HDD), flash memory, a Universal Serial Bus (USB) drive or a combination these or other storage devices. The computing device 900 also includes one or more input or output ("I/O") devices/interfaces 910, which are provided to allow a user to provide input to (such as user strokes), receive output from, and otherwise transfer data to and from the computing device 900. These I/O devices/interfaces 910 may include a mouse, keypad or a keyboard, a touch screen, camera, optical scanner, network interface, modem, other known I/O devices or a combination of such I/O devices/interfaces 910. The touch screen may be activated with a stylus or a finger.

The I/O devices/interfaces 910 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 910 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

I claim:
1. A method comprising:
   generating a visible anchor element in a first document, the visible anchor element associated with a hyperlink containing text representing form field properties of a form field;

converting the first document from a first format to a second document in a second format; and generating a form field element in the second document based on the text representing the form field properties of the form field in the hyperlink.

2. The method of claim 1, further comprising:

receiving a set of inputs; and modifying a display of the visible anchor element based on the set of inputs.

3. The method of claim 2, wherein the set of inputs include modifications to a location of the visible anchor element.

4. The method of claim 1, where generating the form field element in the second document based on the text representing the form field properties of the form field in the hyperlink comprises:

parsing text in the first document to identify the hyperlink containing the form field properties;

determining the form field properties from the text within the hyperlink; and processing the determined form field properties to generate the form field element in the second document.

5. The method of claim 4, wherein parsing the text in the first document to identify the hyperlink containing the form field properties comprises:

determining from a domain of the hyperlink that the hyperlink is the hyperlink containing the form field properties.

6. The method of claim 4, wherein the form field element is generated at a location in the second document corresponding to a location of the visible anchor element in the first document.

7. The method of claim 1, further comprising:

receiving a selection of text in the first document, the selection of text adjacent to the hyperlink containing the form field properties;

receiving a second input selecting a field identifier parameter corresponding to the hyperlink containing the form field properties; and associating the selected field identifier parameter corresponding to the hyperlink containing the form field properties with the selection of text in the first document in a second hyperlink containing the form field properties.

8. The method of claim 1, wherein the form field element is one of a text box, a dropdown menu, a checkbox, a signature field, and a radio button.

9. A non-transitory computer-readable medium storing executable instructions, which when executed by a processing device, cause the processing device to perform operations comprising:

generating a visible anchor element in a first document, the visible anchor element associated with a hyperlink containing text representing form field properties of a form field;

converting the first document from a first format to a second document in a second format; and generating a form field element in the second document based on the text representing the form field properties of the form field in the hyperlink.

10. The non-transitory computer-readable medium of claim 9, wherein the instructions further cause the processing device to perform operations comprising:

receiving a set of inputs; and modifying a display of the visible anchor element based on the set of inputs.

11. The non-transitory computer-readable medium of claim 10, wherein the set of inputs include modifications to a location of the visible anchor element.

12. The non-transitory computer-readable medium of claim 9, wherein the instructions to generate the form field element in the second document based on the text representing the form field properties of the form field in the hyperlink further cause the processing device to perform operations comprising:

parsing text in the first document to identify the hyperlink containing the form field properties;

determining the form field properties from the text within the hyperlink; and processing the determined form field properties to generate the form field element in the second document.

13. The non-transitory computer-readable medium of claim 12, wherein the instructions to parse the text in the first document to identify the hyperlink containing the form field properties further cause the processing device to perform operations comprising:

determining from a domain of the hyperlink that the hyperlink is the hyperlink containing the form field properties.

14. The non-transitory computer-readable medium of claim 12, wherein the form field element is generated at a location in the second document corresponding to a location of the visible anchor element in the first document.

15. The non-transitory computer-readable medium of claim 9, wherein the instructions further cause the processing device to perform operations comprising:

receiving a selection of text in the first document, the selection of text adjacent to the hyperlink containing the form field properties;

receiving a second input selecting a field identifier parameter corresponding to the hyperlink containing the form field properties; and associating the selected field identifier parameter corresponding to the hyperlink containing the form field properties with the selection of text in the first document in a second hyperlink containing the form field properties.

16. The non-transitory computer-readable medium of claim 9, wherein the form field element is one of a text box, a dropdown menu, a checkbox, a signature field, and a radio button.

17. A system comprising:

a memory component; and a processing device coupled to the memory component, the processing device to perform operations comprising:

receiving, by a processing device, an input, the input including a first document generated using a word processing application;

identifying a visible anchor element associated with a hyperlink containing text representing form field properties of a form field of the first document;

converting the first document in a first format to a second document in a second format; and generating a form field element at a first location in the second document based on the text representing the form field properties of the form field in the hyperlink, the first location in the second document corresponding to a second location of the identified visible anchor element in the first document.

18. The system of claim 17, wherein the operations of generating the form field element at the first location in the second document based on the text representing the form field properties of the form field in the hyperlink further comprise:
- identifying the form field properties in the hyperlink containing the form field properties; and
- applying the identified form field properties to the generated form field element.

19. The system of claim 17, wherein the operations of identifying the visible anchor element associated with the hyperlink containing the form field properties in the first document further comprise:
- parsing text in the first document to identify the hyperlink; and
- determining that a domain indicated by the hyperlink indicates the hyperlink is the hyperlink containing the form field properties.

20. The system of claim 17, wherein the form field element is one of a text box, a dropdown menu, a checkbox, a signature field, and a radio button.

* * * * *